United States Patent
Souvignier et al.

(10) Patent No.: US 7,383,295 B2
(45) Date of Patent: Jun. 3, 2008

(54) SELECTIVE SEQUENCE GENERATION METHOD AND APPARATUS

(75) Inventors: Thomas Victor Souvignier, Longmont, CO (US); Purmina Naganathan, Longmont, CO (US); Gregory Lee Silvus, Boulder, CO (US); Nan-Hsiung Yeh, Foster City, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 853 days.

(21) Appl. No.: 10/871,453

(22) Filed: Jun. 18, 2004

(65) Prior Publication Data

US 2005/0283507 A1 Dec. 22, 2005

(51) Int. Cl.
*G06F 7/58* (2006.01)
(52) U.S. Cl. .................................... 708/252
(58) Field of Classification Search ........... 708/252
See application file for complete search history.

(56) References Cited

U.S. PATENT DOCUMENTS

| | | | |
|---|---|---|---|
| 5,241,563 A | 8/1993 | Paik | |
| 5,790,626 A | 8/1998 | Johnson | |
| 6,536,001 B1 | 3/2003 | Cai | |
| 6,560,727 B1 | 5/2003 | Pierson | |
| 6,594,680 B1 | 7/2003 | Gu | |
| 6,636,553 B1 | 10/2003 | Sriram | |
| 6,640,236 B1 * | 10/2003 | Lupin et al. | 708/250 |
| 2001/0016862 A1 * | 8/2001 | Saito et al. | 708/252 |
| 2003/0182544 A1 | 9/2003 | Wise | |

FOREIGN PATENT DOCUMENTS

EP  1078457 B1  3/2002

* cited by examiner

*Primary Examiner*—David H Malzahn
(74) *Attorney, Agent, or Firm*—Cesari and McKenna, LLP; Patricia A. Sheehan

(57) ABSTRACT

A sequence generator is configured to be re-initialized to a value selected derived from a candidate group that is derived from a predetermined value. If and when the re-initializing is performed, it is fully performed within about one clock cycle of setting the sequence generator to the predetermined value. The sequence generator is optionally initialized by a local processor to which it is operatively coupled, after which the processor receives one sequence value each cycle.

24 Claims, 4 Drawing Sheets

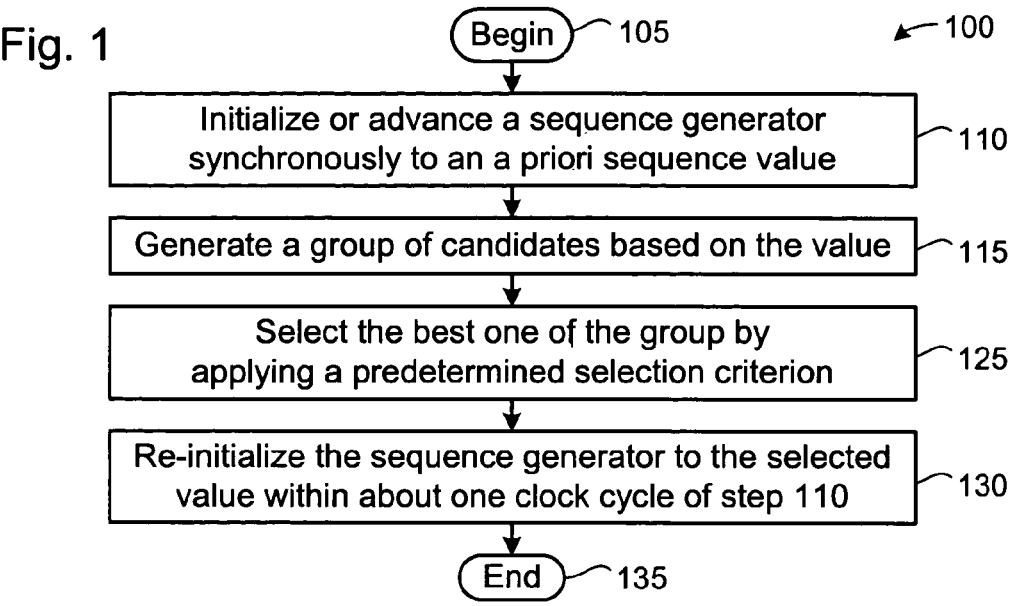
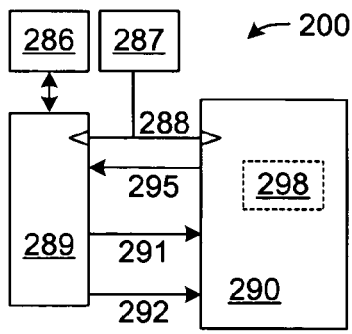
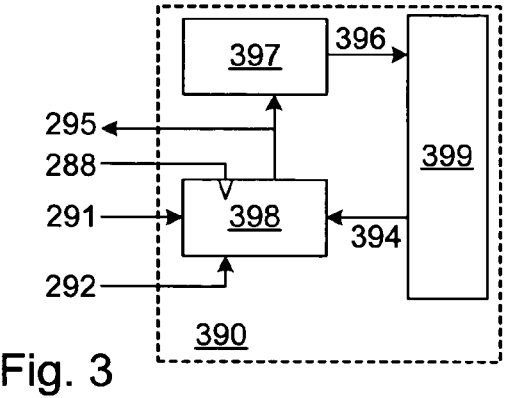
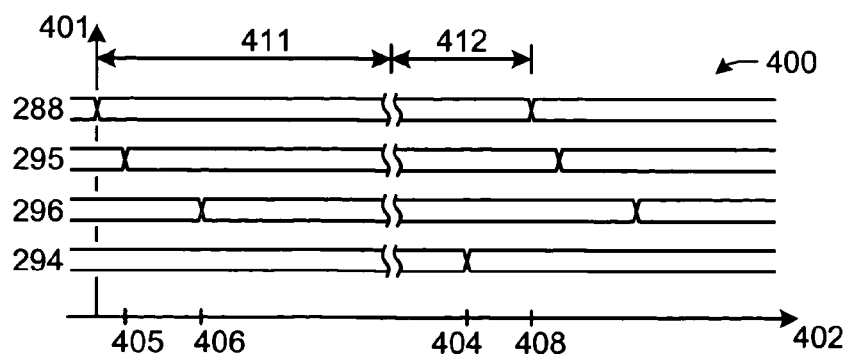

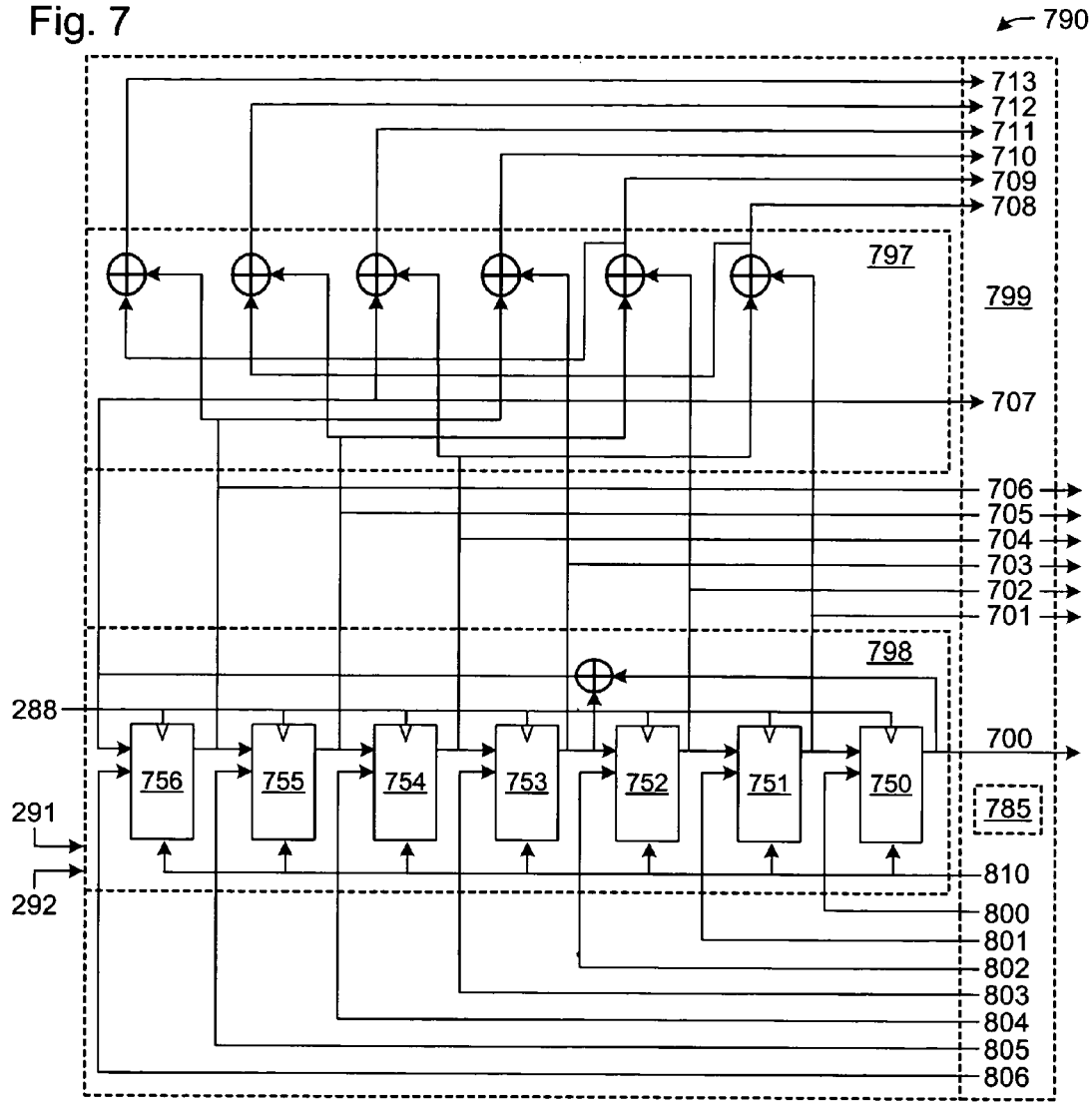

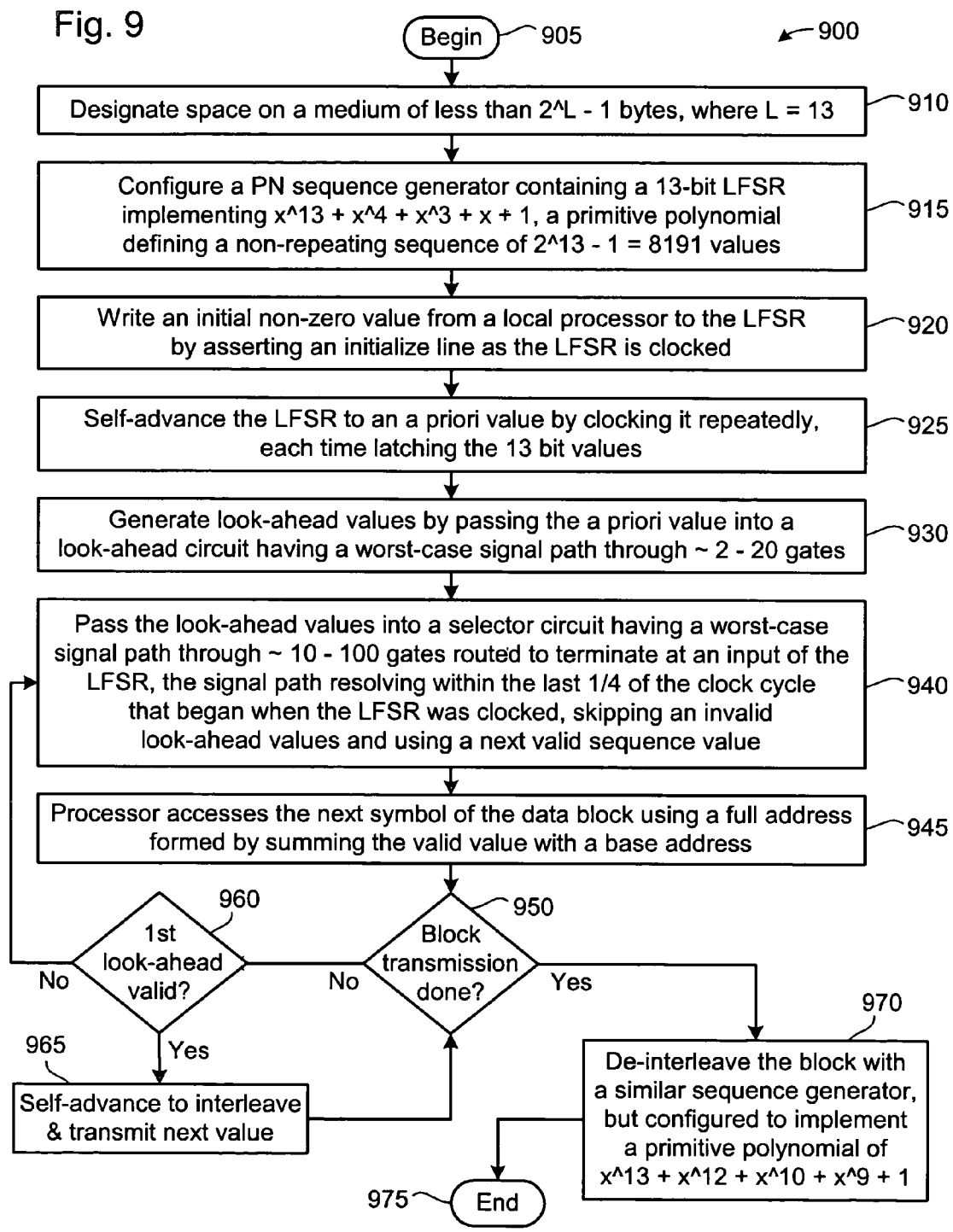

SELECTIVE SEQUENCE GENERATION METHOD AND APPARATUS

FIELD OF THE INVENTION

The present invention relates to a system for generating digital sequences. More particularly, the present invention relates to an improved way to control which values are valid in such sequences.

BACKGROUND OF THE INVENTION

Sequence generators are circuits that efficiently step through and output a predetermined sequence of multiple-bit values. Generally an efficient sequence generator is a circuit that occupies a small space on a semiconductor chip. Although it is not difficult to find or generate a variety of sequence generators of any given length of several bits, the qualitative variety of sequences available by conventional configurations is limited. Moreover it is not generally possible to use a given sequence generator without accepting at least a contiguous subset of the repeating sequence it defines.

One approach to addressing this problem is taught in U.S. Pat. No. 6,353,900 ("Coding System Having State Machine Based Interleaver") issued 5 Mar. 2002 to Sindhushayana et al. The approach is to remove unwanted sequence values with a value filter configured to signal the sequence generator to proceed to the next sequence value when an unwanted value is encountered. Depending on the sequence and the filter, this would apparently require one or several extra clock pulses or significant waits, at one or more sequence positions. What is needed is an implementation that effectively controls a sequence to be generated in a more synchronous fashion.

SUMMARY OF THE INVENTION

A sequence generator is configured to be re-initialized to a value selected derived from a candidate group that is derived from a predetermined value. If and when the re-initializing is performed, it is fully performed within about one clock cycle of setting the sequence generator to the predetermined value.

One embodiment of the present invention is a data handling apparatus including a sequence generator, a processor and an asynchronous circuit. The sequence generator is configured to reach a predetermined value, such as by direct writing by the processor or indirectly by self-advancing synchronously. The data handling apparatus is configured to respond then so that a candidate group will be generated fully within about one clock cycle later. The asynchronous circuit is configured to respond then by re-initializing the sequence generator to a selected value that is derived from the candidate group, also within the one clock cycle.

In a second embodiment, the apparatus is a state machine defining a nonzero state sequence with a sequence length N that is not equal to one less then any integer power of 2. Preferably, L and N are selected so that the sequence length N of the state machine is more than half of $2^L$, wherein the selected value is an L-bit integer. Also preferably, the sequence generator is a linear feedback shift register that expresses an Lth-order primitive polynomial.

In a third embodiment, one of the above-described apparatuses is configured so that the asynchronous circuit includes a look-ahead circuit and a selector circuit. The look-ahead circuit provides a total of M L-bit candidates as the candidate group, where L is not less than M. The selector circuit provides to the sequence generator a selected one of the M candidates derived from a predetermined mathematical criterion that invalidates several values. The criterion is optionally a list of invalid values and/or a limited range within all of the valid values lie.

In a fourth embodiment, the present invention includes a data handling method comprising re-initializing a sequence generator to a selected value that is derived from a candidate group that is derived from a predetermined value, the re-initializing being fully performed within about one clock cycle of setting the sequence generator to the predetermined value. In a preferred method, the re-initializing includes three optional steps. The first is generating the candidate group by passing the predetermined value into an asynchronous circuit having a worst-case signal path that passes through at most 20 gates. The second is routing all of outputs of the asynchronous circuit to terminate at a selector circuit having several outputs. The third is clocking the sequence generator only after fully resolving all of the outputs of the selector circuit asynchronously, the outputs derived from the candidate group.

In a fifth embodiment, one of the above-described methods is further characterized in that several digital values are output asynchronously from a circuit containing several gates that receive the predetermined value synchronously. The digital values comprise a candidate group with at least L candidates, where L is how many bits are in each of the candidates, of which one is adopted as the selected value.

In a sixth embodiment, the present invention includes a data handling method comprising three steps. The first is setting a sequence generator to a first value at a given moment. The second is deriving at least two candidates from the first value. The third is re-setting the sequence generator to a second value selected derived from at least one of the candidates within about one clock cycle of the given moment.

In a seventh embodiment, the present invention includes a data handling method comprising two steps. The first is asynchronously generating the candidate group only during a first half of a given clock cycle in which the sequence generator is set to the predetermined value. The second is providing the selected value to several register input lines during a second half of the given clock cycle.

In an eighth embodiment, the present invention includes a sequence generator configured to generate its highest two values consecutively. Optionally its lowest two values are also generated consecutively. By using an asynchronous selection, one or both of these extremes are preferably removed from the shift register's sequence without a loss of synchronicity.

In a ninth embodiment, one of the above-described methods is modified to include at least six steps. The first is initializing a pseudo-random noise (PN) sequence generator containing an L-bit linear feedback shift register (LFSR), the LFSR defining a non-repeating sequence of almost $2^L$ values. The second is setting the LFSR to an initial non-zero value. The third is receiving several register bits from the LFSR into a logic circuit. The fourth is using the logic circuit to generate M look-ahead values. The fifth is checking whether each of the M look-ahead values is valid until a first valid sequence value is found, skipping any invalid values of the M look-ahead values. The sixth is updating the LFSR with the valid sequence value within the last ¼ of a clock cycle that begins at time zero.

In a tenth embodiment, the present invention includes a setting step that includes a step of clocking the sequence generator while providing the first value to several input lines of the sequence generator. It also includes a step of summing the second value with a base address to generate a full address.

At least one example of each of the above-mentioned embodiments is shown and described in detail below. Additional features and benefits will become apparent upon reviewing the following figures and their accompanying description.

BRIEF DESCRIPTION OF THE DRAWINGS

FIG. 1 shows a method of the present invention in flowchart form.

FIG. 2 shows a typical system of the present invention in block diagram form.

FIG. 3 shows a "pass-thru" sequence generator that can optionally be used in the system of FIG. 2.

FIG. 4 shows a diagram of the timing arrangement for the circuits of FIGS. 2&3.

FIG. 7 shows another self-advancing sequence generator that can optionally be used in the embodiment of FIG. 2.

FIG. 8 shows a table in which each of several rows contains a given clock cycle's new values, in the circuit of FIG. 7.

FIG. 9 shows another method embodiment of the present invention.

DETAILED DESCRIPTION

Figure 5:
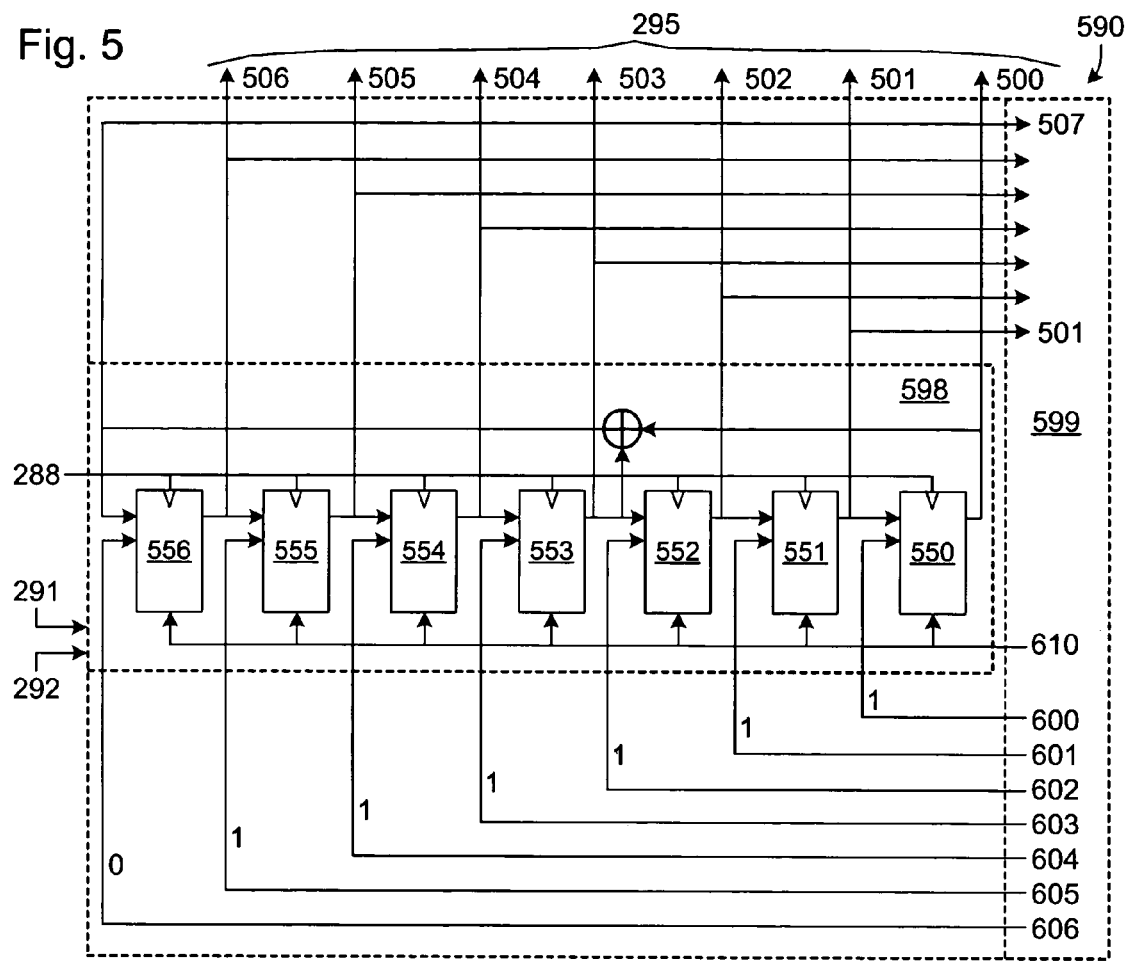
FIG. 5 shows a "self-advancing" sequence generator that can optionally be used in the embodiment of FIG. 2.

Although the examples below show more than enough detail to allow those skilled in the art to practice the present invention, subject matter regarded as the invention is broader than any single example below. The scope of the present invention is distinctly defined, however, in the claims at the end of this document.

To avoid needless distractions from the essence of the present invention, like-numbered reference numerals appearing in a later figure refer to the same elements as those in an earlier figure. Also, numerous aspects of basic engineering and of positioning technologies that are not a part of the present invention (or are well known in the art) are omitted for brevity. For example, this document does not articulate detailed and diverse methods for implementing ordinary asynchronous logic functions with standard gates. Neither does it include a long list of applications in which a sequence generating system of the present invention would be useful. Specific techniques for assembling and interacting with storage or transmission media are likewise omitted, typically being a matter of design choice to those of ordinary skill in that field of technology.

Definitions and clarifications of certain terms are provided in conjunction with the descriptions below, all consistent with common usage in the art but some described with greater specificity. A "sequence length" of a synchronous sequence generator or other synchronous device is the number of distinct synchronous values or states the device can self-generate without repeating a synchronous value or state. A "held value" is a set of binary digits simultaneously held in a series of nodes during a clock cycle portion at which the nodes' values are nominally valid. A register is said to "skip" a value even if the "skipped" value is written to the register briefly during a non-reading time of the clock cycle. A value is "derived from a candidate group" if it is partly or wholly derived from any or all of the candidates that are in the group.

An "interleaver" is a circuit for re-ordering symbols into a same-length grouping. A "de-interleaver" is a circuit for restoring the original order. "Successive" values are groups of two or more scalar values that occur in a raw algorithmic succession like that from a counter, a linear feedback shift register, or other sequence generator. A "clock pulse" is a transition to a new system clock cycle, usually on a rising edge. A "valid" value is one that conforms to a predetermined selection criterion such as a computation and/or a comparison with a list of invalid values.

Turning now to FIG. 1, there is shown a method 100 of the present invention in flowchart form, comprising steps 105 through 135. A sequence generator is synchronously set to a predetermined sequence value 110, after which a group of candidates is asynchronously derived from the value 115. Then a predetermined criterion is used to select one of the generated candidates 125, and the sequence generator is re-initialized to the selected value within about one clock cycle 130.

FIG. 2 shows a typical implementation of the present invention, a system 200 configured to perform the method of FIG. 1 or FIG. 9. An oscillator 287 generates a common system clock signal 288 having a steady nominal frequency in the megahertz or higher, driving the operation of both the sequence generator 290 and the processor 289 coupled to it. Sequence generator 290 includes a multi-bit register 298 containing a value that is sent as output signal 295 to processor 289 at each register update. Sequence generator is optionally implemented as a linear feedback shift register implementing a Galois-field or Fibonacci-field primitive polynomial. Processor 289 initializes register 298 to an initial value 291 by asserting the initialize signal 292 when a clock pulse occurs in signal 288. From there sequence generator 290 enters a normal operating mode in which register 298 is updated to a next value in a predetermined sequence, one value for each new clock cycle.

Unlike prior art apparatuses, system 200 is configured so that register 298 can be re-initialized to a selected value that is derived from a candidate group that is derived from a predetermined value, wherein the re-initializing is fully performed within about one clock cycle of setting the sequence generator to the predetermined value. This gives an important advantage in many applications for which sequence generators are used. System 200, for example, uses a sequence of the present invention that has a length that is more than $2^{\wedge}(L-1)$ and less than $2^{\wedge}L-1$, where L is the length of register 298 in bits. Processor 289 receives this sequence as signal 295 and uses it for quickly interleaving a data block being sent to transmission or storage medium 286. Signal 295 can likewise be used for de-interleaving, to reconstruct an original data block rapidly from an interleaved data block in a memory. Optionally the same sequence generator 290 is used for both interleaving and de-interleaving a given data block that is stored in medium 286.

FIG. 3 shows a "pass-thru" sequence generator 390 that can optionally be used as the sequence generator 290 of FIG. 2. Register 398 is output as signal 295 and is updated synchronously with clock signal 288. Processor 289 can initialize register 398 by asserting both the initial value 291 and the initialize signal 292 while processor 289 and register 398 are simultaneously clocked (i.e. by signal 288). Otherwise, if initialize signal 292 is not asserted, register 398 accepts the next value 394 in response to a clock pulse.

Whenever register 398 changes, logic circuit 397 generates two or more candidates 396 asynchronously. Logic circuit 397 is preferably configured for a small worst-case propagation delay by routing all signal paths through it to pass through only about 2 to 20 gates. Selector circuit 399 applies a predetermined criterion, also asynchronously, to select one of the received candidates 396 as successor value 394. The criterion applied by selector circuit 399 defines which integers are valid of those that logic circuit 397 can possibly generate. The criterion and its asynchronous implementation are mere matters of design choice to one of ordinary skill in the art. Some of the useful criteria include a minimum, a maximum, a disallowed (reserved) value, or some combination of these. Selector circuit 399 is preferably configured for a moderate worst-case propagation delay by routing all signal paths through it to pass through only about 10 to 100 gates.

FIG. 4 shows a diagram of the timing arrangement 400 for the circuits of FIGS. 2&3. Clock signal 288, output signal 295, candidate values 396, and successor value 394 are all plotted against time 402 starting at a time 0 under worst-case conditions of voltage and temperature. Time 0 is defined by a clock pulse on clock signal 288, which causes register 398 to accept a new value asynchronously, at time 405. Somewhat later, but within the earlier half 411 of the current clock cycle, logic circuit 397 resolves the last of the candidate values 396 asynchronously at time 406. Candidate values 396 are transmitted by C+L to C×L parallel signal lines, where C is the number of candidates and L is the register size in bits. All L bits of successor value 394 are resolved at or before time 404, within the later half 412 of the current clock cycle, before the next clock pulse at time 408. (Timing arrangement 400 shows the worst-case propagation delay of all signal paths that make up output signal 295, candidate values 396, and successor value 294.) One of ordinary skill will recognize that the worst-case path is that which passes through the largest number of logic gates for asynchronous implementations like logic circuit 397 and selector circuit 399 constructed of elementary logic gates.

FIG. 5 shows a "self-advancing" sequence generator 590 that can optionally be used as the sequence generator 290 of FIG. 2. Unlike the "pass-thru" sequence generator 390 of FIG. 3, sequence generator 590 contains a maximum-length sequence generator (MLSG) 598 as a component. MLSG 598 comprises L=7 multiplexers 556,555,554,553,552,551, 550 each having a 1-bit output. MLSG 598 provides its present value as system output 295, i.e. bit 506 through 500. Output 295 changes in response to each pulse of clock signal 588. Processor 289 can initialize MLSG 598 by asserting both the initial value 291 and the initialize signal 292 while processor 289 and MLSG 598 are simultaneously clocked (i.e. by signal 288).

Otherwise, if initialize signal 292 is not asserted, a clock pulse will cause MLSG 598 to be updated to a value that depends on skip signal 610. If skip signal 610 is not asserted, MLSG will step forward to the next value in its characteristic sequence. Those of skill in the art will recognize that MLSG is a linear feedback shift register (LFSR) in this mode. The six least-significant bits 500 through 506 are obtained by down-shifting, i.e. as the next-higher bit of each. The shift bit 507 is obtained as bit 503 XOR'd with bit 550. Expressed more conventionally, MLSG 598 implements a polynomial $X^7+X^3+1$ by obtaining each shift bit as $$X[7]=X[3]\oplus X[0]. \qquad (1)$$

Because this expresses an Lth-order primitive polynomial, MLSG 598 generates a non-repeating sequence of length $2^L-1=127$. That is to say MLSG 598 will index through all $2^L-1$ of its possible non-zero values in successive clock cycles, provided that neither the initialize signal 292 nor the skip signal 610 is asserted. A length 5 LFSR implementing a primitive polynomial would similarly generate a non-repeating sequence having a length $2^5-1=31$.

Several other primitive polynomials, and ways to identify and implement primitive polynomials, are described in U.S. Pat. No. 6,560,727 ("Bit Error Rate Tester Using Fast Parallel Generation of Linear Recurring Sequences"), issued 6 May 2003 to Pierson et al., and in U.S. Pat. No. 6,353,900 ("Coding System Having State Machine Based Interleaver") issued 5 Mar. 2002 to Sindhushayana et al.

Self-advancing sequence generator 590 provides to selector circuit 599 its successive value (as bits 507-501). Selector circuit is configured to implement a criterion that defines one invalid value, 127. This can be implemented by routing bits 507-501 to inputs to an AND gate having an output that is skip signal 610. Skip signal 610 will be asserted only if the next value is 1111111 (decimal 127).

If skip signal is asserted, the "next sequential" value is skipped, and a "next valid" value of the sequence is placed into MLSG 598 instead. For the polynomial $X^7+X^3+1$, 126 is the value that follows 127. When skip signal 610 is asserted, 1111110 (decimal 126) is therefore asserted as the seven bits 606,605,604,603,602,601,600 that comprise the "selection" signal. Gates are not needed to generate bits 606-600 where, as in the present case, only one value in the maximum-length sequence is invalid. No other "selection" values are ever used by MLSG 598 other than the one right after the invalid value, so the signal lines for bits 606-600 can simply be hard-wired as 1111110 as shown. In a more complex (and typical) implementation of the present invention, selector circuit 599 would be configured for a moderate worst-case propagation delay by routing all signal paths terminating in bits 606-600 and skip signal 610 to pass through only about 10 to 100 elementary logic gates.

Figure 6:
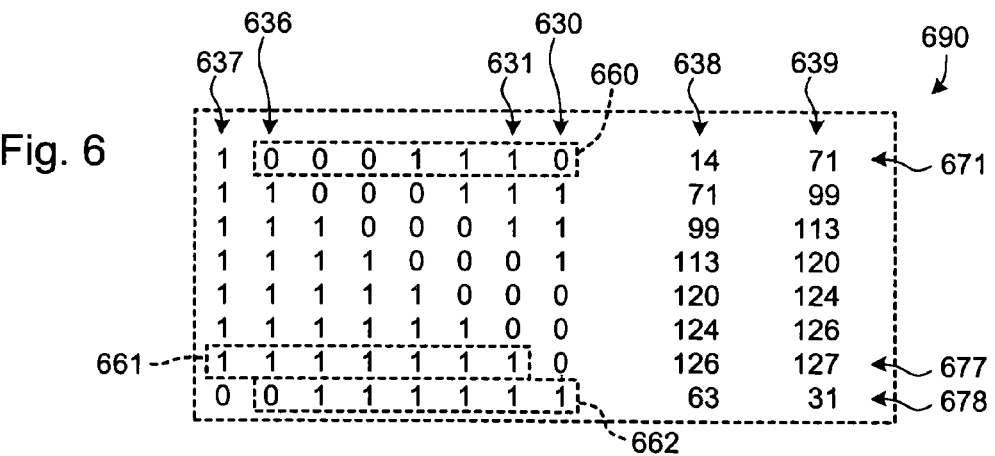
FIG. 6 shows a table in which each of several rows contains a given clock cycle's new values, in the circuit of FIG. 5.

FIG. 6 shows a table 690 in which each one of the rows 671-678 contains a given clock cycle's new values, in the circuit of FIG. 5. Columns 637-630 indicate bits 507-500, respectively. Column 638 expresses the corresponding value of the "present value" bits 506-500 in a decimal form. Column 638 expresses the corresponding value of the "next value" bits 507-501 in a decimal form. In the cycle of row 671, the present value 660 of 0001110 corresponds to decimal value 14. The "next value" shown in row 671 is binary 1000111, decimal 71. Each row's next value is the following row's present value until row 677. There, the next value is 127, which does not become row 678's present value. Rather, 0111111 (decimal 63) does.

FIG. 7 shows another self-advancing sequence generator 790 that can optionally be used as the sequence generator 290 of FIG. 2. Sequence generator 790 contains a maximum-length sequence generator (MLSG) 798 the same as that of FIG. 5. MLSG 798 comprises L=7 multiplexers 756,755,754,753,752,751,750 each having a 1-bit output. MLSG 798 provides its present value as system output 295, i.e. bit 706,705,704,703,702,701,700 as shown. For any nonzero value in MLSG 798, output 295 changes in response to each pulse of clock signal 288. Processor 289 can initialize MLSG 798 by asserting both the initial value 291 and the initialize signal 292 while processor 289 and MLSG 598 are simultaneously clocked (i.e. by signal 288).

Look-ahead bit 707 is obtained in accordance with Equation 1 above, just as in FIG. 5, and a first successive value (i.e. first candidate) is provided to selector circuit 799 as bits 707-701. Look-ahead circuit 797 similarly generates several additional look-ahead bits 708,709,710,711,712,713, each as shown according to $$X[n]=X[n-4]\oplus X[n-7]. \qquad (2)$$

The second successive value (i.e. second candidate) is provided as bits 708-702, and the seventh successive value (i.e. seventh candidate) is provided as bits 713-707. All seven candidates provided to selector circuit 799 are generated asynchronously, as are all of the outputs of selector circuit 799.

Selector circuit contains a mode register 785 that controls the behavior of the selector circuit. The processor 289 can change the criterion implemented by the selector circuit by changing the value of the mode register 785. In FIG. 7, for example, selector circuit 799 deems all values higher than mode register as invalid.

In operation selector circuit 799 determines whether the first candidate is valid. If so, skip signal 810 is not asserted and MLSG 798 steps forward normally. Otherwise, skip signal 810 is asserted and the first valid candidate is identified. It can easily be verified by calculation that at least one of the seven candidates will be valid so long as the value of the mode register 785 is more than 70. For smaller values of mode register 785, more look-ahead bits implementing Equation 2 above will be needed.

FIG. 8 shows a table 890 in which each one of the rows 871-877 contains a given clock cycle's new values, in the circuit of FIG. 7. The mode register 785 contains 100, so all higher values are invalid. Column 830 contains a given cycle's present value as expressed in bits 706-700, and columns 831-837 contain the seven candidates generated by look-ahead circuit 797.

In the cycle of row 871, for example, the first and second candidates are both invalid because they exceed 100. Selector 799 accordingly generates 0111011 (decimal 59) at bits 806,805,804,803,802,801,800, and asserts skip signal 810. Similarly, in the cycle of row 876, the first five are all invalid. Selector 799 accordingly generates 0111111 (decimal 63) at bits 806-800, and asserts skip signal 810.

As described above, it may be that asynchronous selector circuit 799 using mode register 785 as described is unduly bulky in terms of circuitry. To reduce this, mode register 785 is preferably implemented so that only about 2 to 20 modes are defined. For example, selector circuit 799 can be designed to obtain the threshold by multiplying the contents of the mode register by 10. If processor 289 writes 9 (decimal) to mode register 785, then, all candidates higher than 90 will be invalid. In this way only about 10% of the possible integer threshold values would need to be accommodated in selector circuit 799.

Turning now to FIG. 9, there is shown a specific method 900 of the present invention, including steps 905-975. At step 910, a space is designated on a medium of less than $2^L-1$ bytes, L being a sequence generator register size in bits, L being 13 in the present example. The Pseudo-random Noise (PN) sequence generator is configured, at step 915, to contain a 13-bit LFSR implementing $x^{13}+x^4+x^3+x+1$. This is a primitive polynomial defining a non-repeating sequence of $2^{13}-1=8191$ values.

The PN sequence generator is initialized by writing a non-zero value from a local processor to the LFSR by asserting an initialize line as the LFSR is clocked 920. Next, the LFSR is self-advanced to a predetermined value by clocking it again, each time latching the 13 bit values 925. After each self-advance, look-ahead values are generated by passing the current LFSR value into a look-ahead circuit having a worst-case signal path through ~2-20 gates. At some point in the sequence, one of these new values is the predetermined value 930, a last valid value before an invalid value to be skipped.

At step 940, the look-ahead values are passed into a selector circuit having a worst-case signal path through about 10-100 gates, routed to terminate at an input of the LFSR. The signal path resolves within the last ¼ of the clock cycle that began when the LFSR was clocked, skipping any invalid look-ahead values and finding a next valid sequence value. The next byte (or other symbol) of the data block is then accessed by a first local processor using a full address formed by combining the valid value with a base address 945.

If the block transmission is not done 950, the first look-ahead value is tested to determine whether it is valid 960. If so, the PN sequence generator self-advances to interleave and send the current symbol to a transmission or storage medium 965. This interleave/send cycle continues until the first look-ahead value is invalid 960 or the block transmission is done 950.

When the block transmission is done 950, the block is then received, optionally by a second processor operatively coupled to a second PN sequence generator that preferably implements the converse of the polynomial of step 915. (In this case, the de-interleaver polynomial is $x^{13}+x^{12}+x^{10}+x^9+1$.) This second processor/generator de-interleaves the data block using essentially the same steps 920 through 965. (The "skipping" function of step 940, in this case, can use a selector circuit essentially the same as that of the first processor.)

Alternatively characterized, referring again to FIGS. 1-8, a first embodiment of the present invention is a data handing apparatus (such as 200) including a sequence generator (such as 798), a processor (such as 289) and an asynchronous circuit (such as 399). The sequence generator is configured to reach a predetermined value, such as by direct writing by the processor or indirectly by self-advancing synchronously. The data handling apparatus is configured to respond then so that a candidate group will be generated fully within about one clock cycle later (such as by look-ahead circuit 797). The asynchronous circuit is configured to respond then by re-initializing the sequence generator to a selected value that is derived from the candidate group, also within the one clock cycle.

In a second embodiment, the apparatus is a state machine defining a nonzero state sequence with a sequence length N that is not equal to one less then any integer power of 2. Preferably, L and N are selected so that the sequence length N of the state machine is more than half of $2^L$, where the selected value is an L-bit integer. Also preferably, the sequence generator is a linear feedback shift register that expresses an Lth-order primitive polynomial.

In a third embodiment, one of the above-described apparatuses is configured so that the asynchronous circuit includes a look-ahead circuit and a selector circuit. The look-ahead circuit provides a total of M L-bit candidates as the candidate group, where L is not less than M. The selector circuit provides to the sequence generator a selected one of the M candidates derived from a predetermined mathematical criterion that invalidates several values. The criterion is optionally a list of invalid values and/or a limited range within all of the valid values lie.

In a fourth alternative embodiment, the present invention includes a data handling method (such as 100,900) comprising re-initializing a sequence generator to a selected value that is derived from a candidate group that is derived from a predetermined value, the re-initializing being fully performed within about one clock cycle of setting the sequence generator to the predetermined value. In a preferred method, the re-initializing includes three optional steps. The first is generating the candidate group by passing the predetermined value into an asynchronous circuit having a worst-case signal path that passes through at most 20 gates.

The second is routing all of outputs of the asynchronous circuit to terminate at a selector circuit (such as 399,599, 799) having several outputs. The third is clocking the sequence generator only after fully resolving all of the outputs of the selector circuit asynchronously, the outputs derived from the candidate group (such as by the timing arrangement 400 of FIG. 4).

In a fifth embodiment, one of the above-described methods is further characterized in that several digital values are output asynchronously from a circuit containing several gates that receive the predetermined value synchronously. The digital values comprise a candidate group with at least L candidates, where L is how many bits are in each of the candidates, of which one is adopted as the selected value.

In a sixth alternative embodiment, the present invention includes a data handling method comprising three steps. The first is setting a sequence generator to a first value at a given moment (e.g. by step 110 of FIG. 1). The second is deriving at least two candidates from the first value (e.g. by step 115). The third is re-setting the sequence generator to a second value derived from (i.e., selected based on) at least one of the candidates within about one clock cycle of the given moment (e.g. by step 130).

In a seventh embodiment, the present invention includes a data handling method comprising two steps. The first is asynchronously generating the candidate group only during a first half (such as 411 of FIG. 4) of a given clock cycle in which the sequence generator is set to the predetermined value. The second is providing the selected value to several register input lines during a second half (such as 412) of the given clock cycle.

In an eighth embodiment, the present invention includes a (self-advancing) sequence generator configured to generate its highest two values consecutively. Optionally its lowest two values are also generated consecutively. By using an asynchronous selection, one or both of these extremes are preferably removed from the shift register's sequence without a loss of synchronicity. This illustrates one way that a selection step of the present invention can be used to generate a better-performing pseudo-random sequence.

In a ninth embodiment, one of the above-described methods is modified to include at least six steps. The first is initializing a pseudo-random noise (PN) sequence generator containing an L-bit linear feedback shift register (LFSR), the LFSR defining a non-repeating sequence of almost $2^L$ values (such as by step 915 of FIG. 9). The second is setting the LFSR to an initial non-zero value (such as by steps 920-925). The third is receiving several register bits from the LFSR into a logic circuit (such as by step 930). The fourth is using the logic circuit to generate M look-ahead values (such as by step 930). The fifth is checking whether each of the M look-ahead values is valid until a first valid sequence value is found, skipping any invalid values of the M look-ahead values (such as by step 940). The sixth is updating the LFSR with the valid sequence value within the last ¼ of a clock cycle that begins at time zero (such as by step 940).

In a tenth embodiment, the present invention includes a setting step that includes a step of clocking the sequence generator while providing the first value to several input lines of the sequence generator (such as by step 920). It also includes a step of summing the second value with a base address to generate a full address (such as by step 945).

Although the polynomials and inequalities described above with reference to FIGS. 5-9 give useful embodiments of the present invention suitable for study, it will be understood that an unlimited number of other sequence generators and selection criteria are likewise available to the skilled practitioner. Variations in the shift register examples and accompanying candidate generation circuitry are easily suited to implement the present invention, for example, and many are a matter of mere design choice in light of the teachings above.

More generally, it is to be understood that even though numerous characteristics and advantages of various embodiments have been set forth in the foregoing description, together with details of the structure and function of various embodiments of the invention, this disclosure is illustrative only. Changes may be made in detail, especially in matters of structure and arrangement of parts within the principles of the present invention to the full extent indicated by the broad general meaning of the terms in which the appended claims are expressed. For example, the particular elements may vary depending on the particular interleaving/de-interleaving application while maintaining substantially the same functionality. Although the more detailed embodiments described above primarily relate to sequence generators implementing linear polynomials, other applications can readily benefit from these teachings without departing from the scope and spirit of the present invention.

Moreover, it will be appreciated by those skilled in the art that the selection of a suitable asynchronous circuit involves several trade-offs. The best solution will depend on the application, and except as described in this document, no particular solution to this trade-off is of critical importance to the present invention. A selection of designs will typically be available and readily derived, depending on the worst-case timing and other performance characteristics required. One of ordinary skill will be able to use the above description to design and implement a variety of methods and devices using suitable mathematical descriptions in light of the teachings above, without undue experimentation.

What is claimed is:

1. A data handling apparatus comprising:
    a sequence generator;
    a processor configured to initialize the sequence generator; and
    an asynchronous circuit configured to re-initialize the sequence generator to a selected value that is derived from a candidate group that is derived from a predetermined value, and wherein the re-initializing is fully performed within about one clock cycle of setting the sequence generator to the predetermined value with the asynchronous circuit operating asynchronously to sequence generating operations of the sequence generator.

2. The data handling apparatus of claim 1 wherein the apparatus is a state machine defining a nonzero state sequence with a sequence length N that is not equal to one less then any integer power of 2.

3. The data handling apparatus of claim 2 wherein the selected value is an L-bit integer and wherein the sequence length N of the state machine is more than half of $2^L$, wherein L and N are integers.

4. The data handling apparatus of claim 1 wherein the sequence generator is a linear feedback shift register that expresses an Lth-order primitive polynomial, wherein L is an integer greater than 2.

5. The data handling apparatus of claim 1 wherein the sequence generator includes a shift register.

6. The data handling apparatus of claim 1 wherein the asynchronous circuit derives the selected value using a mathematical criterion that is a threshold that separates the several invalidated values from all valid values.

7. The data handling apparatus of claim 1 wherein the asynchronous circuit includes:
a look-ahead circuit configured to provide a total of M L-bit candidates as the candidate group, wherein L and M are integers and L is not less than M; and
a selector circuit configured to provide to the sequence generator a selected one of the M candidates derived from a predetermined mathematical criterion that invalidates several values.

8. A data handling apparatus comprising:
a sequence generator; and
means for re-initializing the sequence generator to a selected value that is derived from a candidate group that is derived from a predetermined value,
wherein the means operates asynchronously to sequence generating operations of the sequence generator and the re-initializing is fully performed within about one clock cycle of setting the sequence generator to the predetermined value.

9. The data handling apparatus of claim 8, further comprising:
a processor configured to initialize the sequence generator; and
a clock circuit configured to control the operation of the processor and to advance the sequence generator.

10. The data handling apparatus of claim 8 wherein the re-initializing means is a look-ahead circuit configured to generate several sequential look-ahead values that constitute the candidate group.

11. The data handling apparatus of claim 8, further comprising a sequence generator that includes a shift register.

12. A data handling method comprising
a step (a) of initialing a sequence generator and generating sequence values; and
a step (b) of re-initializing the sequence generator to a selected value that is derived from a candidate group that is derived from a predetermined value, the step (a) of re-initializing being fully performed within about one clock cycle of setting the sequence generator to the predetermined value with the selected value derived in operations that are asynchronous to the sequence generating operations of the sequence generator.

13. The data handling method of claim 12 wherein the step (a) of re-initializing includes steps of:
(a1) asynchronously generating the candidate group only during a first half of a given clock cycle wherein the sequence generator is set to the predetermined value; and
(a2) providing the selected value to several register input lines during a second half of the given clock cycle.

14. The data handling method of claim 12 wherein the re-initializing step (a) includes steps of:
(a1) generating the candidate group by passing the predetermined value into an asynchronous circuit having a worst-case signal path that passes through at most 20 gates;
(a2) routing several outputs of the asynchronous circuit to terminate at a selector circuit having several outputs; and
(a3) clocking the sequence generator only after fully resolving all of the outputs of the selector circuit asynchronously derived from the candidate group.

15. The data handling method of claim 12 wherein the re-initializing step (b) includes a step (b1) of generating the candidate group as several digital values output asynchronously from a circuit containing several gates that receive the predetermined value synchronously.

16. The data handling method of claim 12 wherein the re-initializing step (b) includes a step (b1) of generating the candidate group as at least L candidates, wherein L is a total number of bits that are in each of the candidates.

17. A data handling method comprising steps of:
(a) setting a sequence generator to a first value at a given moment;
(b) operating asynchronously from sequence generation operations and generating at least two candidates derived from the first value; and
(c) within about one clock cycle of the given moment, re-setting the sequence generator to a second value selected derived from at least one of the candidates.

18. The data handling method of claim 17 wherein the setting step (a) includes a step (a1) of clocking the sequence generator while providing the first value to several input lines of the sequence generator.

19. The data handling method of claim 17, further comprising a step (d) of combining the second value with a base address to generate a full address.

20. The data handling method of claim 19 wherein the setting step (a) includes a step (a1) of clocking the sequence generator while providing the first value to several input lines of the sequence generator.

21. The data handling method of claim 17 wherein the generating step (b) includes a step (b1) of providing exactly X+L bits from a look-ahead circuit to a selector circuit, wherein X is a total number of candidates generated in the generating step (b), wherein L is how many bits are in each of the candidates, and wherein X and L are integers and X<L.

22. The data handling method of claim 17 wherein the re-setting step (c) includes steps of:
(c1) passing all of the candidates through an asynchronous circuit having a worst-case signal path that passes through at most 100 gates; and
(c2) routing the worst-case signal path to terminate at an input of the sequence generator.

23. A data handling method comprising steps of:
(a) initializing a pseudo-random noise sequence generator containing an L-bit linear feedback shift register (LFSR), the LFSR defining a non-repeating sequence of almost $2^L$ values;
(b) setting the LFSR to an initial non-zero value responsive to a system clock transition at time zero;
(c) receiving several register bits from the LFSR into a logic circuit;
(d) using the logic circuit to generate M look-ahead values, wherein M is an integer>1;
(e) checking asynchronously whether each of the M look-ahead values is valid until a first valid sequence value is found, skipping any invalid values of the M look-ahead values; and
(f) updating the LFSR with the valid sequence value from the checking step (e), within the last ¼ of a clock cycle that begins at time zero.

24. The data handling method of claim 23 wherein the initializing step (a) includes steps of:
(a1) asserting L bit values each to a respective input of the LFSR, wherein L is an integer>1;
(a2) asserting an initialize line of the LFSR; and
(a3) clocking the LFSR.

* * * * *